US012157177B2

(12) United States Patent
Patil et al.

(10) Patent No.: US 12,157,177 B2
(45) Date of Patent: Dec. 3, 2024

(54) CUTTING DISC FOR A MACHINE FOR HARVESTING STEM-LIKE PLANTS

(71) Applicant: DEERE & COMPANY, Moline, IL (US)

(72) Inventors: Akshay B. Patil, Pune (IN); Sunil S. Aralekar, Pune (IN); Jan-Dirk Schild, Coesfeld (DE); Vinod Joshi, Haldwani (IN)

(73) Assignee: DEERE & COMPANY, Moline, IL (US)

( * ) Notice: Subject to any disclaimer, the term of this patent is extended or adjusted under 35 U.S.C. 154(b) by 263 days.

(21) Appl. No.: 18/061,534

(22) Filed: Dec. 5, 2022

(65) Prior Publication Data
US 2023/0264279 A1   Aug. 24, 2023

(30) Foreign Application Priority Data

Feb. 24, 2022   (DE) .......................... 102022104463.7

(51) Int. Cl.
B23D 61/02   (2006.01)
A01D 34/52  (2006.01)

(52) U.S. Cl.
CPC ........... *B23D 61/025* (2013.01); *A01D 34/52* (2013.01)

(58) Field of Classification Search
CPC ....... B23D 61/025; B23D 61/02; A01D 34/52
USPC .................................. 83/835, 663
See application file for complete search history.

(56) References Cited

U.S. PATENT DOCUMENTS

| | | | | |
|---|---|---|---|---|
| 275,338 A | * | 4/1883 | Hobson | A01D 34/52 56/DIG. 17 |
| 336,697 A | * | 2/1886 | Clemson | B23D 61/025 83/835 |
| 390,034 A | * | 9/1888 | Peckover | B23D 45/105 83/404 |
| 11,639,592 B2 | * | 5/2023 | Nilsson | E02F 5/14 83/835 |
| 2010/0037745 A1 | * | 2/2010 | Rattunde | B23D 65/00 83/838 |
| 2018/0071744 A1 | * | 3/2018 | Hughes | B02C 18/06 |
| 2018/0326516 A1 | | 11/2018 | Lutz et al. | |
| 2019/0082589 A1 | * | 3/2019 | Litwiller | A01F 29/095 |
| 2019/0262919 A1 | * | 8/2019 | Mattes | B23D 61/025 |

(Continued)

FOREIGN PATENT DOCUMENTS

DE   19531918 A1   3/1997
DE   19951459 A1   5/2001
(Continued)

OTHER PUBLICATIONS

Extended European Search Report and Written Opinion issued in European Patent Application No. 23153947.9, dated Jul. 20, 2023, in 07 pages.

*Primary Examiner* — Omar Flores Sanchez

(57) ABSTRACT

A cutting disc for a machine for harvesting stem-like plants includes a number of elements which together can be attached or are attached to a bracket forming a circular ring with an outer cutting edge. At least one of the elements is attachable to the bracket in a first position, in which a first edge of the element forms the outer cutting edge, and in a second position, in which a second edge of the element forms the outer cutting edge. No matter whether the element is in the first of second position, a circular cutting edge is made up.

9 Claims, 5 Drawing Sheets

(56) References Cited

U.S. PATENT DOCUMENTS

2019/0351494 A1* 11/2019 Breutzman .......... A01G 23/081
2020/0038975 A1* 2/2020 Woermann ................ B23C 5/08
2020/0060085 A1* 2/2020 Coon ..................... A01D 34/52

FOREIGN PATENT DOCUMENTS

| DE | 19952566 C1 | 6/2001 |
| --- | --- | --- |
| DE | 10116675 A1 | 10/2002 |
| DE | 102006051619 A1 | 5/2008 |
| DE | 102007038274 B3 | 4/2009 |
| EP | 1483955 A2 | 12/2004 |
| EP | 3949715 A1 | 2/2022 |

* cited by examiner

CUTTING DISC FOR A MACHINE FOR HARVESTING STEM-LIKE PLANTS

CROSS-REFERENCE TO RELATED APPLICATIONS

This application claims the benefit of German Patent Application No. DE 102022104463.7, filed on Feb. 24, 2022, the disclosure of which is hereby incorporated by reference.

TECHNICAL FIELD

The disclosure generally relates to a cutting disc for a machine for harvesting stem-like plants.

BACKGROUND

German patent application DE 195 31 918 A describes a machine suitable for harvesting stem-like plants, such as maize, for attachment to a forage harvester, which has several mowing and feeding devices. The mowing and feeding devices include a lower cutting disc in the manner of a circular saw knife and conveyors arranged above it with recesses for holding plants. The cutting discs are rotated at a higher speed than the conveyors. The plants separated from the stubble remaining in the ground by means of the cutting discs are accepted by the conveyor discs and transported through the conveyor discs and by transverse conveyor drums in the gusset areas between the mowing and feeding devices to the center of the machine and transferred by inclined conveyor drums to an infeed channel of a forage harvester.

The cutting discs in such machines are composed of "n" number of segments, each of which defines 1/n of a circular ring and extends around the circumference of a bracket assigned to them, rotatably connected to the frame of the machine and attached to the bracket with screws. The outer perimeter of the segments is equipped with teeth, the cutting edges of which are sharpened.

Other known machines for harvesting stem-like plants include fixed cutting discs on which the plants are moved along through the conveyor discs (DE 10 2007 038 274 B3) or chain conveyors with stationary cutting discs (DE 101 16 675 A) or rotating cutting discs (DE 199 51 459 A) arranged underneath.

Despite a hard coating that reduces wear, the cutting discs are wear parts that must be replaced regularly. Since the worn cutting discs are unusable, spare parts must be ordered or stocked in good time (or carried on board of the forage harvester for the case of an unexpected damage). An approach to reduce this problem can be found in DE 10 2006 051 619 A1, where it is proposed to provide the teeth with predetermined breaking points where external sections of the teeth can be separated, so that after the separation of the outer sections now shorter teeth with new, sharp cutting edges remain. This arrangement suffers from certain disadvantages, as the outer teeth can break off at higher loads.

The object underlying this disclosure is to provide a cutting disc for a machine for harvesting stem-like plants with mowing and feeding devices, which allows a longer service life than previous cutting discs.

SUMMARY

A cutting disc for a machine for harvesting stem-like plants is provided. The cutting disc includes a number of elements that can be attached or are attached to a bracket, together forming a circular ring with an outer cutting edge. At least one, more or all of the elements is or are arranged to be mounted to the bracket in a first position, in which a first edge of the element forms the outer cutting edge and in a second position, in which a second edge of the element forms the outer cutting edge.

In other words, at least one of the elements can be attached to the bracket not only in a single position, in which its first edge forms the part of the outer cutting edge but can also be attached to the bracket in a second position, in which a second edge of the element forms the part of the outer cutting edge. The element, which can be moved to the second position after wear of the first edge, thus has two edges, each forming a cutting edge, and can be used longer than the previous elements, which have only a single cutting edge. No matter whether said element is in the first of second position, a circular cutting edge is made up.

The cutting edge of the elements can be formed in a known manner by teeth, which are in particular sharpened and possibly hardened or provided with a hard coating.

The repositionable element(s) can be rotated around a symmetry line of 180° between the first and second positions. The symmetry line can be parallel to and optionally perpendicular to the edge of the element provided with the cutting edge.

These elements may be flat, i.e., planar, in themselves or angled, i.e. non-planar in particular along the line of symmetry running parallel to the edge of the element which edge is provided with the cutting edge.

In one possible embodiment, two different types of elements can be attached alternatingly to the bracket. Here, a first type of elements may have a smaller radial dimension than a second type of elements and be at least partially arranged in a recess of the element of the second type. The outer dimensions of the first type of elements in a circumferential direction (measured at the circumference of the cutting disc) can be smaller than those of the second type of elements.

A machine for harvesting stem-like plants may have one or more mowing and feeding devices, each of which has a fixed one or rotatably driven, lower cutting disc of the described type and above it arranged conveying elements with recesses for the reception of plants.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

Prior Art

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
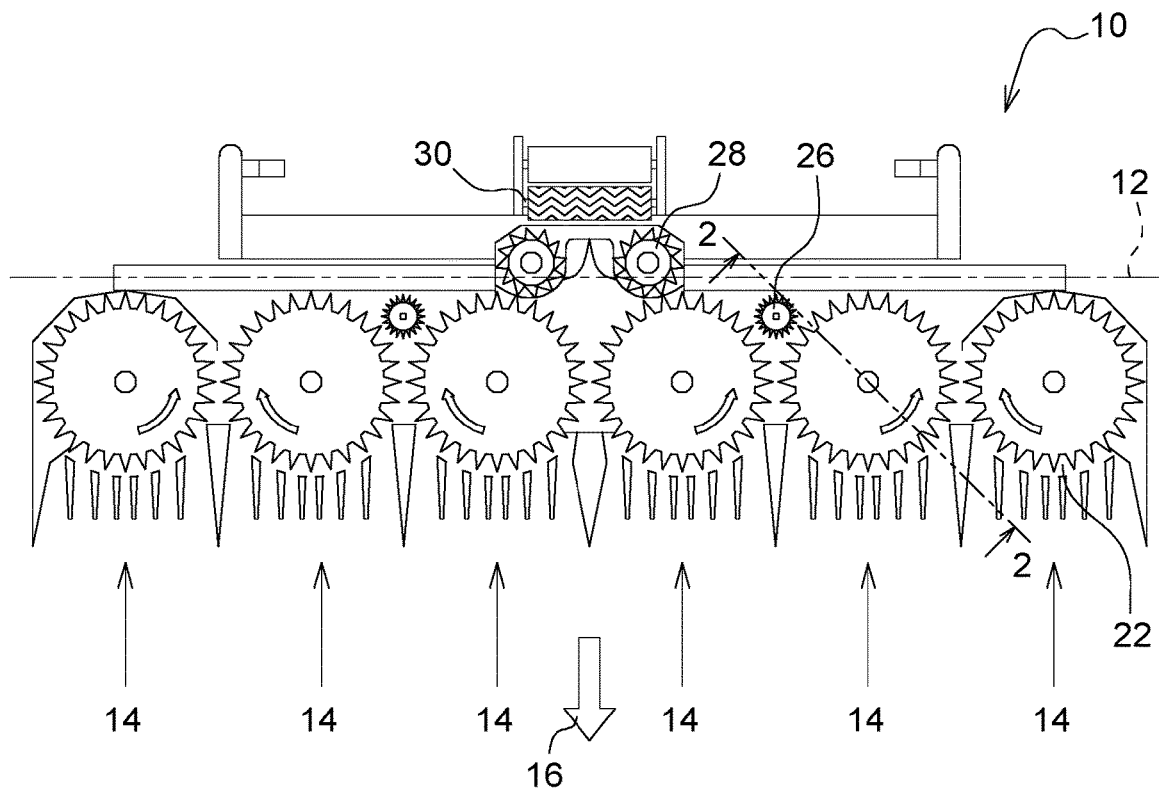
FIG. 1 is a schematic top view a machine for harvesting stem-like plants.

Referring to the Figures, wherein like numerals indicate like parts throughout the several views, a machine for harvesting stem-lie plants is generally shown at 10 in FIG. 1. The machine 10 includes a frame 12. On the frame 12 of the machine 10, four mowing and feeding devices 14 are attached side by side of each other on both sides of a longitudinal median plane 16. The mowing and feeding devices 14 are each composed of a lower, rotatable cutting disc 18 (see FIG. 2) and several coaxially arranged conveyor elements 20. The cutting discs 18 are equipped with sharp teeth at the edge or otherwise sharpened to separate the plant stems from the stubble remaining in the soil. The stems are accommodated in recesses 22 of the conveying elements 20 and are taken over at the back of the mowing and feeding devices 14 by rear transverse conveyor drums 26, which convey the plants in conjunction with the backs of the mowing and feeding devices 14 to the center of the machine 10, where they are fed by dispensing conveyor drums 28 to the feed rollers 30 of a forage harvester (not shown) carrying the machine 10 in a forward direction V over a field moving and driving its moving elements. In the following, directions, such as front and back, refer to the forward direction V.

Figure 2:
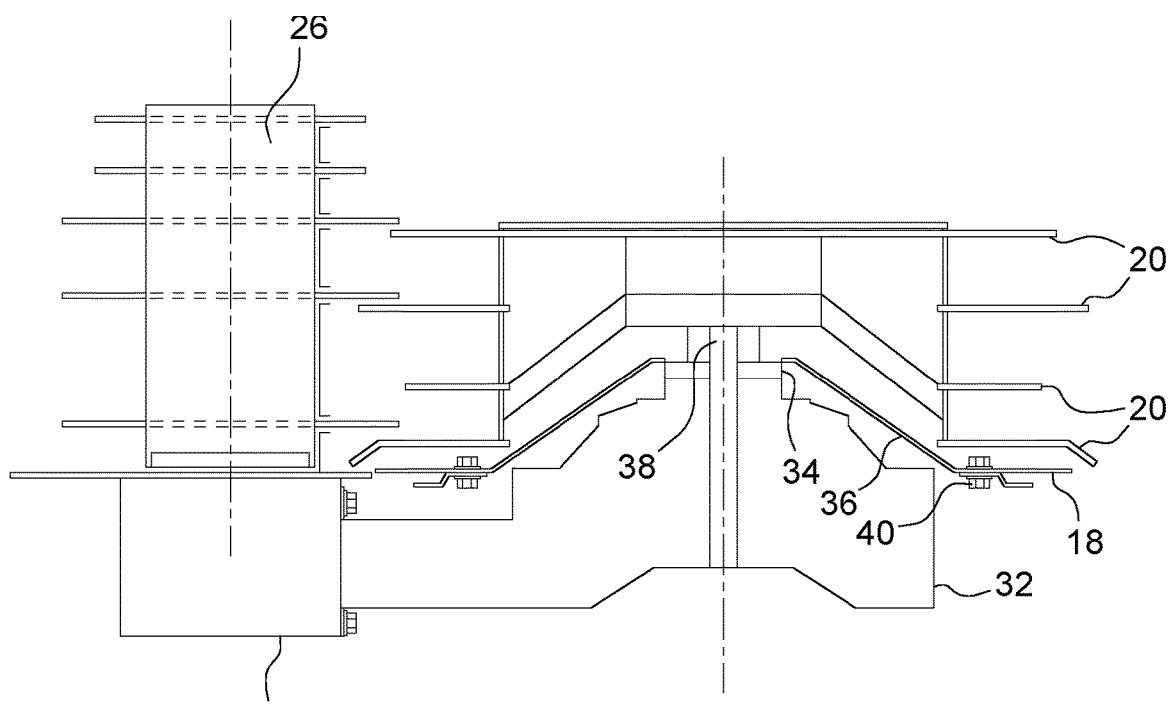
FIG. 2 is a schematic sectional view through the machine along line 2-2 shown in FIG. 1.

FIG. 2 shows a section through machine 10 along line 2-2 of FIG. 1. A part of the drive train for the conveyor elements 20 and cutting discs 18 of the feeder and mowing device 14 containing transmission housing 32 is bolted to the frame 12. The gearbox housing 32 comprises a hollow shaft 34 extending upwards, which serves to drive a downwardly curved bracket 36, to the circumference of which the cutting disc 18 is attached by screws 40. A shaft 38 extends through the hollow shaft 34 to drive the conveyor elements 20.

Figure 3:
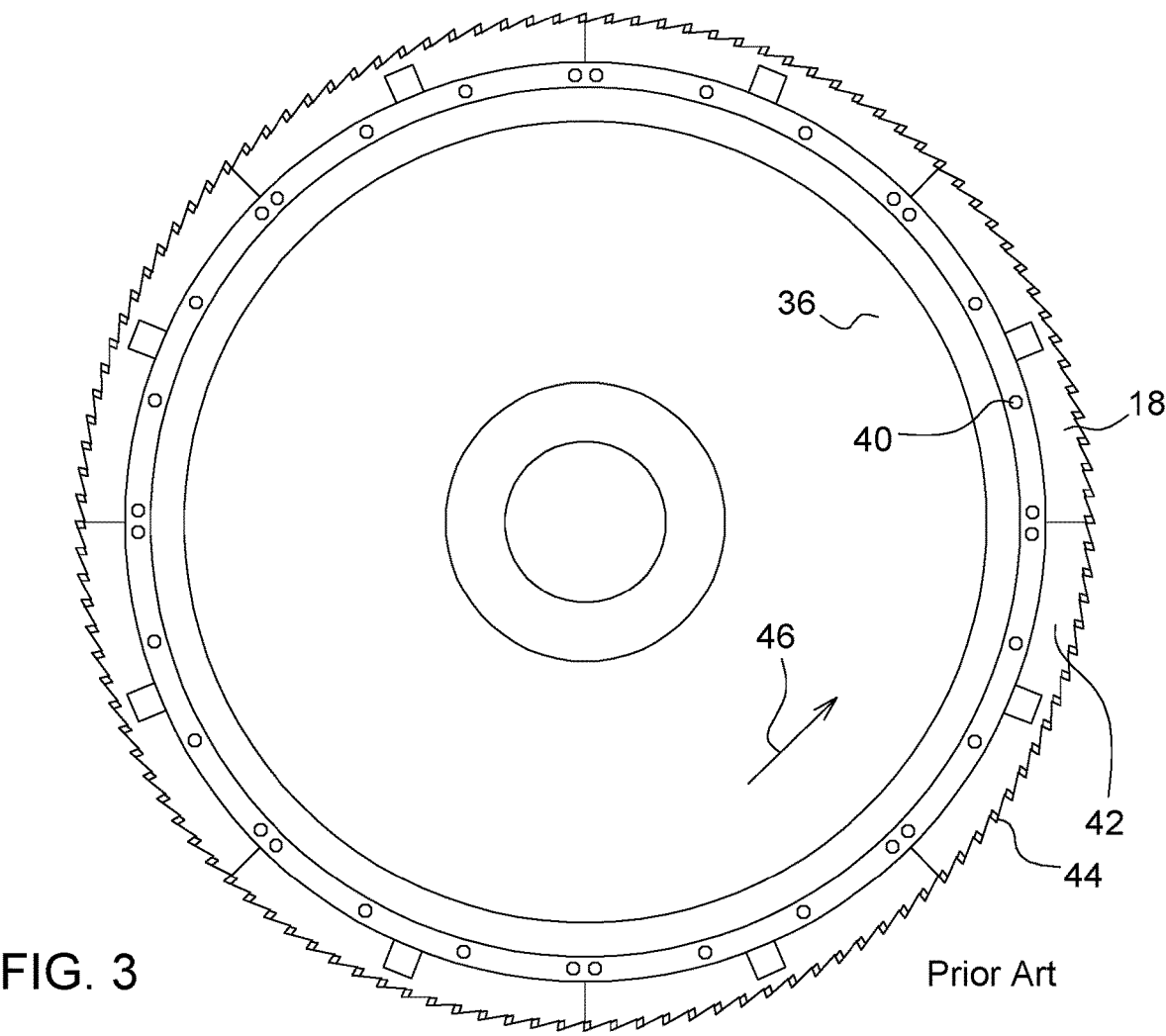
FIG. 3 is a schematic top view of a cutting disc according to the prior art.
Figure 4:
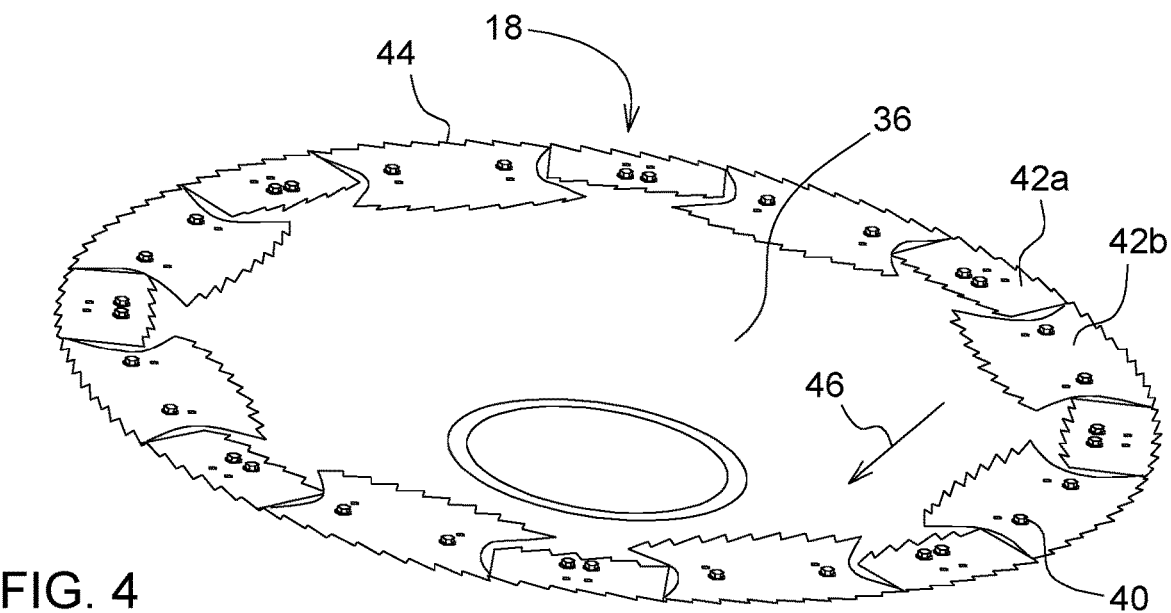
FIG. 4 is a schematic perspective view of a first embodiment of a cutting disc viewed from below.

Prior Art FIG. 3 shows a view of a cutting disc 18 according to the state of the art from top together with the bracket 36. Around the circumference of the bracket 36, a total of eight, flat, i.e., planar, and identical elements 42 are distributed, each forming one eighth of a circular ring. Elements 42 each comprise a number of openings for the screws 40 and on their outer circumference a series of teeth 44 comprising outer cutting edges extending at an angle directed inwards in the direction of rotation 46. The cutting edges are relatively sharp and the teeth 44 are preferably provided with a hard coating (e.g., made of tungsten carbide). Since the teeth 44 are only provided at the outer edge, the elements 42 need to be replaced when the cutting edges are dull.

FIGS. 4 to 10 show a first embodiment of a cutting disc 18 according to the disclosure, which comprises two different types of elements 42a, 42b, which are arranged alternatingly in the circumferential direction and together form the circular cutting disc 18. A total of eight first elements 42a and eight second elements 42b are present and connected to the bracket 36 by screws 40, although larger and smaller numbers of elements 42a, 42b could also be provided. For a non-rotating cutting disc 18, a half circle would be sufficient.

Figure 5:
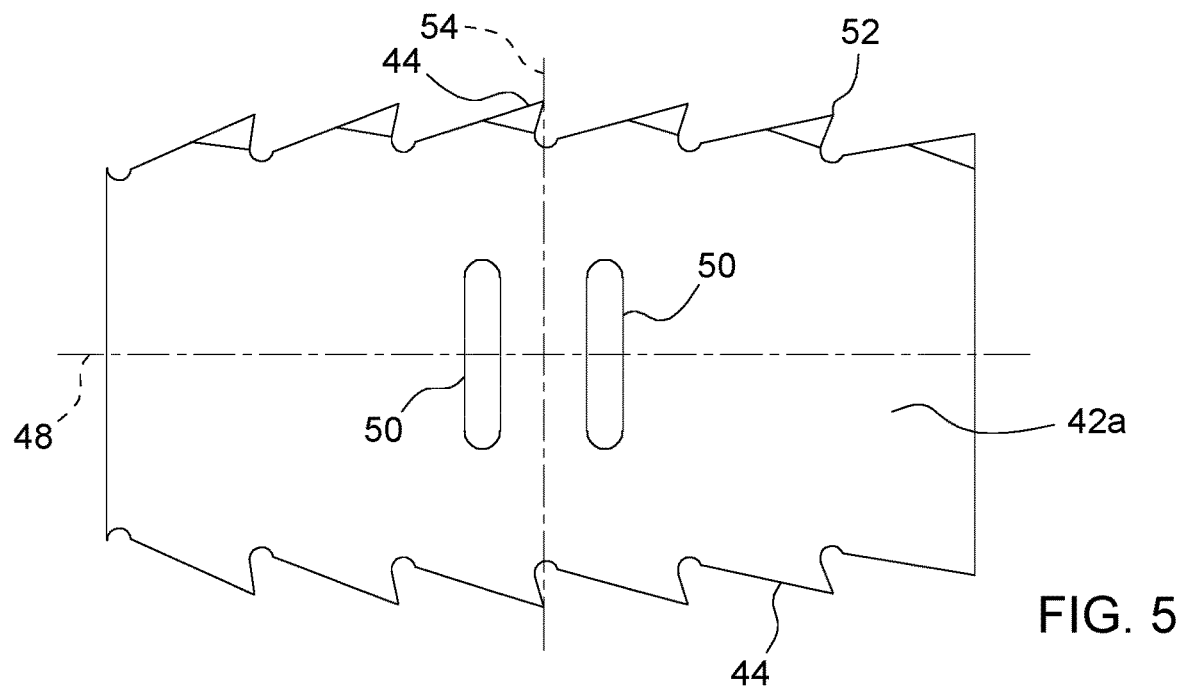
FIG. 5 is a schematic view of a first element of the cutting disc from a first side.
Figure 6:
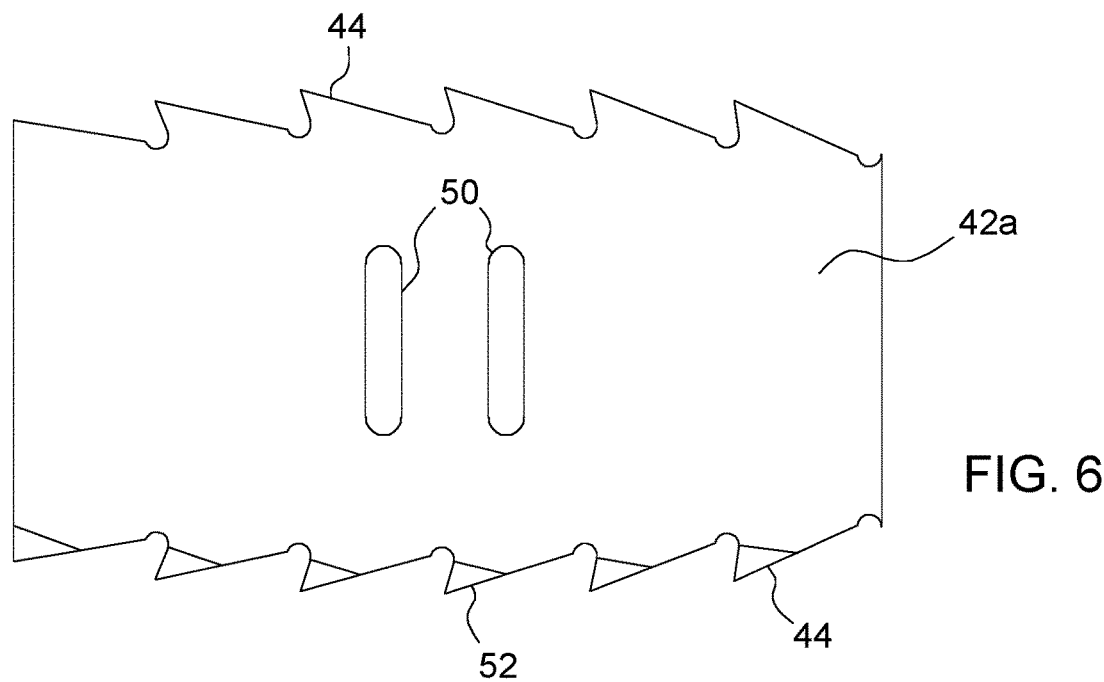
FIG. 6 is a schematic view of the element according to FIG. 5 from a second side.
Figure 7:
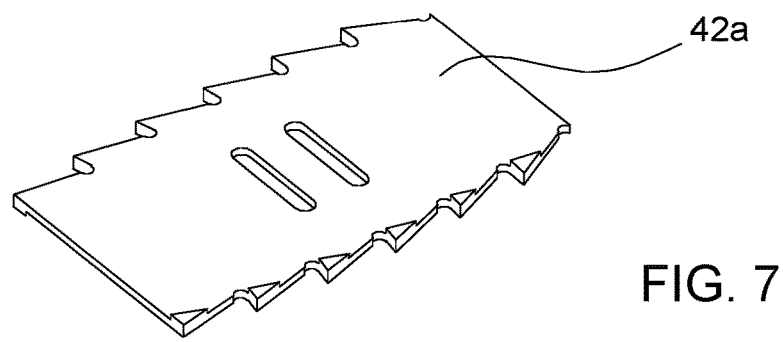
FIG. 7 is a schematic perspective view of the element according to FIGS. 5 and 6.

FIGS. 5 to 7 show a first element 42a from above, below and in a perspective view. The first element 42a is symmetrical to a symmetry line 48 and comprises two rows of teeth 44 attached to two edges of element 42a, which are located on both sides of the symmetry line 48. The symmetry line 48 extends, when the first element 42a is attached to the bracket 36, along the direction of rotation 46. The teeth 44 extend in the direction of the symmetry line 48, but are arranged on a circular arc so that ultimately the circular shape of the cutting disc 18 can be achieved.

In the embodiment shown, ground surfaces 52 of teeth 44 on one side of the symmetry line 48 are arranged on a first surface of the first element 42a (shown in FIG. 5 on top and in FIG. 6 on the bottom) and on the other side of the symmetry line 48 on a second surface of the first element 42a (shown in FIG. 5 on the bottom and in FIG. 6 on top), while the directions of the teeth 44 on both sides of the symmetry line 48 is the same (in FIG. 5 with the cutting edges formed by the sharpened surfaces 52 to the left). If the first element 42a is therefore rotated by 180° around the symmetry line 48, the configuration shown (direction of teeth 44 and position of the sanded surfaces 52) is thus preserved. As a result, even when the teeth 44 on one side of the symmetry line 48 are worn, the first elements 42a can be demounted, rotated by 180° around the symmetry line 48 and reassembled. This doubles the service life of the first elements 42a. Slotted holes 50 are used to accommodate the screws 40 and allow a certain displacement of the first elements 42a in the radial direction of the cutting disc 18.

It should also be noted that one could arrange the teeth 44 alternatively symmetric to a second symmetry line 54 (in FIG. 5 shown vertically) of the first element 42a. Then the sharpened surfaces 52 would be arranged on a single surface of the first element 42a (would therefore only be seen in FIG. 5, not in FIG. 6—or vice versa) and the directions of the teeth 44 would be different on both sides of the symmetry line 48. The first element 42a, when the teeth 44 are worn at one edge of the first element 42a, would be dismantled in order to turn over both symmetry lines 48 and 54 by 180° each and then reassembled.

FIG. 7 shows that the first element 42a in the area of teeth 44 on the sides with the sharpened surfaces 52 may have a greater material thickness than in the area in between.

Figure 8:
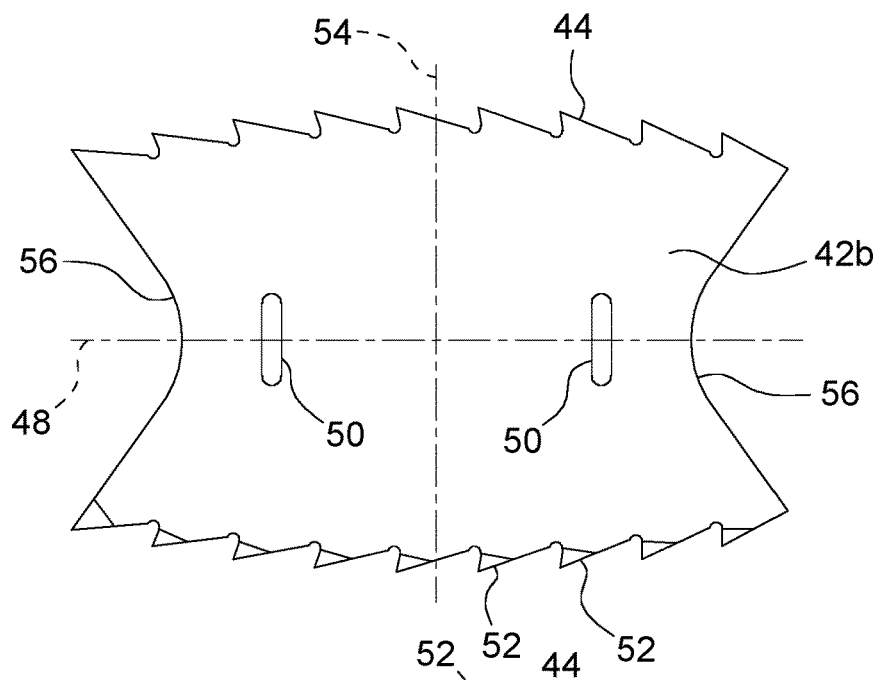
FIG. 8 is a schematic view of a second element of the cutting disc from a first side.
Figure 9:
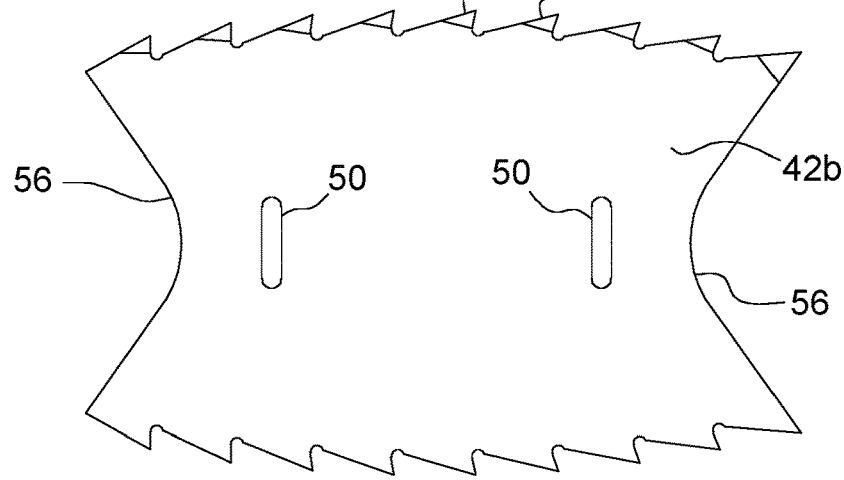
FIG. 9 is a schematic view of the element according to FIG. 8 from a second side.
Figure 10:
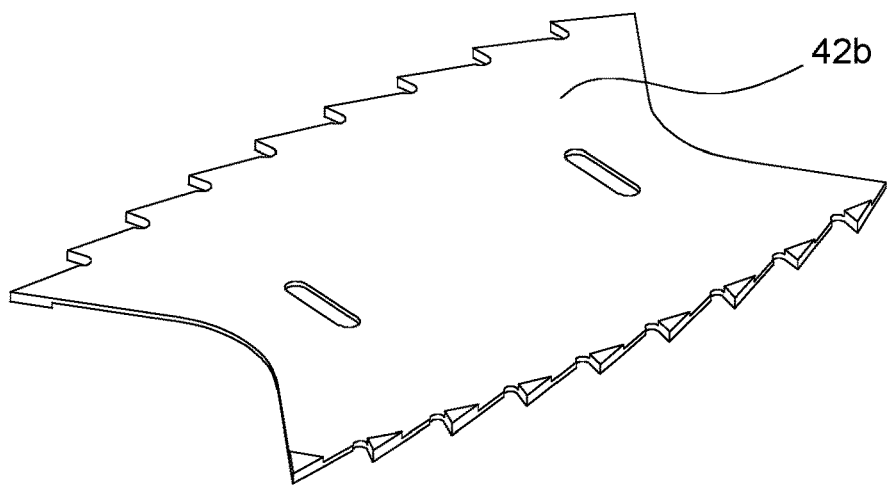
FIG. 10 is a schematic perspective view of the element according to FIGS. 8 and 9.

FIGS. 8 to 10 show a second element 42b from above, below and in a perspective view. The second element 42b is symmetrical to a symmetry line 48 and comprises two rows of teeth 44 attached to two edges of element 42b, which are located on both sides of the symmetry line 48. The symmetry line 48 extends, when the second element 42b is attached to the bracket 36, along the direction of rotation 46. The teeth 44 extend in the direction of the symmetry line 48, but are arranged on a circular arc so that ultimately the circular shape of the cutting disc 18 can be achieved.

In the embodiment shown, ground surfaces 52 of teeth 44 are arranged on one side of the symmetry line 48 on a first surface of the second element 42b (shown in FIG. 8 on top and in FIG. 9 on the bottom) and on the other side of the symmetry line 48 on a second surface of the second element 42b (shown in FIG. 8 on the bottom and in FIG. 9 on top), while the directions of teeth 44 are the same on both sides of the symmetry line 48 (in FIG. 8 with the cutting edges formed by the ground surfaces 52 to the left). If the second element 42b is rotated 180° around the symmetry line 48, the configuration shown (direction of teeth 44 and position of the ground surfaces 52) is thus preserved. As a result, even if the teeth 44 on one side of the symmetry line 48 are worn, the second elements 42b can be dismounted, rotated by 180° around the symmetry line 48 and reassembled. This doubles the service life of the second elements 42b. Slotted holes 50 are used to accommodate the screws 40 and allow a certain displacement of the second elements 42b in the radial direction of the cutting disc 18.

It should also be noted that one could arrange the teeth 44 alternatively symmetric to a second symmetry line 54 (in FIG. 8 shown vertically) of the second element 42b. Then the sharpened surfaces 52 would be arranged on a single surface of the second element 42b (would therefore only be seen in FIG. 8, not in FIG. 9—or vice versa) and the directions of the teeth 44 on both sides of the symmetry line 48 different. The second element 42a, when the teeth 44 are worn at one edge of the second element 42b, would be dismantled in order to turn both symmetry lines 48 and 54 over by 180° and then reassemble them.

While the non-toothed edges of the first elements 42a are straight, the non-toothed edges of the second elements 42b have recesses 56. In addition, the radial dimensions (i.e., distances between the edges with the teeth 44) of the second elements 42b are greater than of the first elements 42a. The recesses 56 offer free space in which the first elements 42a are accommodated when the elements 42a, 42b are mounted on the bracket 36.

Both types of elements 42a, 42b are (not considering the teeth 44) symmetric to both symmetry lines 48 and 54. The edges spaced from the symmetry line 48 extending in the rotating direction 46 are sharpened and serve as cutting edges and form a convex curve to achieve the circular shape of the cutting disk 18. The other edges are not sharpened and formed to enable mounting all elements 42a, 42b in a common plane of the cutting disk. The outer dimensions of the first type of elements 42a, measured in circumferential direction, are smaller than those of the second type of elements 42b.

FIG. 10 shows that the second element 42b may have in the area of teeth 44 on the side with the sharpened surfaces 52 a greater material thickness than in the area in between.

After all this, it can be seen that the first and second elements 42a, 42b are provided with rows of teeth 44 at their edges on both sides of a symmetry line 48, of which only one row is on the outside and interacts with the crop, while the other row is inactive. The first and second elements 42a, 42b can thus be dismantled from bracket 36 and turned over when the first row of teeth is worn, so that then the second rows of teeth 44 interact with the crop. This procedure is made possible by the alternating attachment of the first and second elements 42a, 42b and the recesses 56 of the second elements 42b, in which the first elements 42a, which are shorter in the radial direction, are included.

Figures 11, 12:
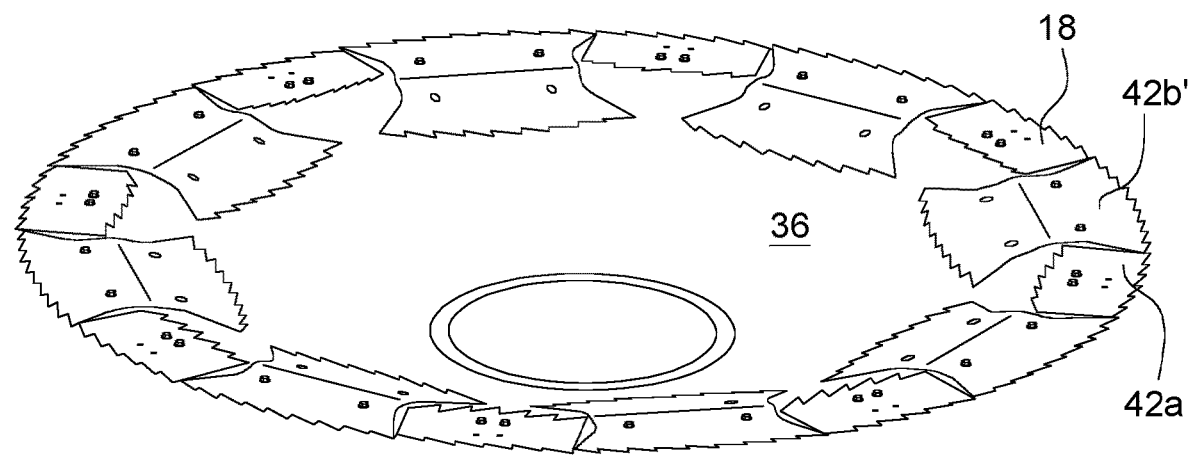
FIG. 11 is a schematic perspective view of a second embodiment of a cutting disc shown from below.
FIG. 12 is a schematic perspective view of a second embodiment of a second element.

In the second embodiment according to FIGS. 11 and 12, the second elements 42b' are non-planar and bent at the symmetry line 48 by an angle 58 relative to each other, so that the non-active side extends upwards on the curved inside of the bracket 36. The first elements 42a correspond to the first embodiment.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A cutting disc for a machine for harvesting stem-like plants, the cutting disc comprising:
    a bracket;
    a plurality of elements attached to the bracket and forming a circular ring defining an outer cutting edge;
    wherein at least one of the plurality of elements is attachable to the bracket in a first position, in which a first edge of the at least one element forms the outer cutting edge, and in a second position, in which a second edge of the at least one element forms the outer cutting edge;
    wherein the plurality of elements includes at least one first element and at least one second element arranged alternatively on the bracket;
    wherein the at least one first element has a smaller radial dimension than the at least one second element; and
    wherein the at least one first element is at least partially arranged in a recess of the at least one second element.

2. The cutting disc according to claim 1, wherein the first edge and the second edge of the at least one element includes a plurality of teeth.

3. The cutting disc according to claim 2, wherein the at least one element is rotatable around a symmetry line by one hundred eight degrees (180°) between the first position and second position thereof.

4. The cutting disc according to claim 3, wherein the symmetry line is parallel to the first edge and the second edge of the at least one element.

5. The cutting disc according to claim 3, wherein the symmetry line is perpendicular to the first edge and the second edge of the at least one element.

6. The cutting disc according to claim 1, wherein the at least one elements is planar.

7. The cutting disc according to claim 1, wherein the at least one element is non-planar and angled about the line of symmetry.

8. The cutting disc according to claim 1, wherein the at least one first element has a smaller dimension in a circumferential direction than the at least one second element.

9. The cutting disc according to claim 1, wherein the at least one element of the plurality of elements includes all of the plurality of elements.

* * * * *